(12) United States Patent
Navasivasakthivelsamy

(10) Patent No.: US 10,904,090 B2
(45) Date of Patent: Jan. 26, 2021

(54) VIRTUAL MACHINE PLACEMENT BASED ON NETWORK COMMUNICATION PATTERNS WITH OTHER VIRTUAL MACHINES

(71) Applicant: Nutanix, Inc., San Jose, CA (US)

(72) Inventor: Arun Navasivasakthivelsamy, Sammamish, WA (US)

(73) Assignee: Nutanix, Inc., San Jose, CA (US)

( * ) Notice: Subject to any disclaimer, the term of this patent is extended or adjusted under 35 U.S.C. 154(b) by 245 days.

(21) Appl. No.: 15/881,038

(22) Filed: Jan. 26, 2018

(65) Prior Publication Data
US 2019/0238411 A1 Aug. 1, 2019

(51) Int. Cl.
| | |
|---|---|
| G06F 9/455 | (2018.01) |
| H04L 12/24 | (2006.01) |
| G06F 9/50 | (2006.01) |
| H04L 12/931 | (2013.01) |

(52) U.S. Cl.
CPC ...... *H04L 41/0893* (2013.01); *G06F 9/45558* (2013.01); *G06F 9/505* (2013.01); *H04L 41/0896* (2013.01); *H04L 49/45* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 7,716,667 B2 * | 5/2010 | van Rietschote | ... G06F 9/45533 718/1 |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,223,561 B2 * | 12/2015 | Orveillon | ............... G06F 8/63 |
| 9,336,030 B1 * | 5/2016 | Marr | ................. G06F 9/5077 |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Esther B. Henderson
(74) *Attorney, Agent, or Firm* — Foley & Lardner LLP

(57) ABSTRACT

A method of determining an optimal host machine to place a virtual machine in a virtualization environment is described. The virtualization environment includes a first rack of host machines and a second rack of host machines, where a first host machine of the first rack of host machines is designated as a leader node. The method includes receiving a request to launch a second virtual machine configured to communicate with a first virtual machine. The method includes identifying, from the first rack of host machines and the second rack of host machines, a cluster of host machines. The method includes computing, for each host machine of the cluster, an aggregate network bandwidth consumed by the host machine. The method includes selecting a host machine from the cluster based on the aggregate network bandwidth computed for the selected host machine. The method includes launching the second virtual machine on the selected host machine.

18 Claims, 6 Drawing Sheets

(56) References Cited

U.S. PATENT DOCUMENTS

| | | | |
|---|---|---|---|
| 9,772,866 B1 | 9/2017 | Aron et al. | |
| 10,050,850 B2* | 8/2018 | Du | H04L 43/04 |
| 2007/0271560 A1* | 11/2007 | Wahlert | G06F 9/5005 |
| | | | 718/1 |
| 2008/0201711 A1* | 8/2008 | Amir Husain | G06F 9/445 |
| | | | 718/1 |
| 2014/0059207 A1 | 2/2014 | Gulati et al. | |
| 2014/0282520 A1* | 9/2014 | Sabharwal | G06F 9/5027 |
| | | | 718/1 |
| 2016/0127184 A1* | 5/2016 | Bursell | G06F 15/177 |
| | | | 709/221 |
| 2017/0199798 A1* | 7/2017 | Jain | G06F 11/3024 |
| 2018/0097874 A1* | 4/2018 | Sampathkumar | H04L 41/0896 |

OTHER PUBLICATIONS

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Cano, Ignacio, et al. "Curator: Self-Managing Storage for Enterprise Clusters" (Mar. 27, 2017), from https://www.usenix.org/conference/nsdi17/.

* cited by examiner

VIRTUAL MACHINE PLACEMENT BASED ON NETWORK COMMUNICATION PATTERNS WITH OTHER VIRTUAL MACHINES

BACKGROUND

A virtual machine ("VM") may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

SUMMARY

Aspects of the present disclosure relate generally to a cloud infrastructure and a virtual environment management system, and more particularly to systems and methods for determining an optimal host machine to place a virtual machine based on its network communication patterns with other virtual machines.

One implementation disclosed herein is a system for determining an optimal host machine to place a virtual machine in a virtualization environment. The system includes a first leaf switch connected to a first rack of host machines. The system also includes a second leaf switch connected to a second rack of host machines. The system also includes a spine switch connected to the first leaf switch and the second leaf switch. The system also includes a first host machine of the first rack of host machines designated as a leader node and executing a first virtual machine. The leader node is configured to receive a request to launch a second virtual machine configured to communicate with the first virtual machine. In some implementations, the system is configured to identify, in response to the request and from the first rack of host machines and the second rack of host machines, a cluster of host machines. In some implementations, the system is configured to compute, for each host machine of the cluster of host machines, an aggregate network bandwidth consumed by the host machine. In some implementations, the system is configured to select a host machine from the cluster of host machines based on the aggregate network bandwidth computed for the selected host machine. In some implementations, the system is configured to launch the second virtual machine on the selected host machine.

In some implementations, the selected host machine being a second host machine of the first rack of host machines. In some implementations, the identified cluster of host machines is absent any host machine from the first rack of host machines. In some implementations, the cluster of host machines comprises fewer host machines than a sum of the host machines of the first rack of host machines and the host machines of the second rack of host machines.

In some implementations, the leader node is further configured to compute, for each host machine of the first rack of host machines and the second rack of host machines, a resource consumption amount associated with the host machine. In some implementations, the leader node is further configured to identify, from the first rack of host machines and the second rack of host machines, the cluster of host machines by determining that the resource consumption amounts associated with the cluster of host machines are lower than the resource consumption amounts associated with the other host machines. In some implementations, the resource is at least one of a memory space and central processing unit (CPU) cycles.

In some implementations, the leader node is further configured to compute for each host machine of the cluster of host machines a current network bandwidth consumed by the host machine. In some implementations, the leader node is further configured to compute for each host machine of the cluster of host machines an estimated network bandwidth consumed by the host machine to execute the second virtual machine. In some implementations, the leader node is further configured to compute for each host machine of the cluster of host machines the aggregate network bandwidth by adding the current network bandwidth to the estimated network bandwidth.

In some implementations, the leader node is further configured to the estimated network bandwidth based on historical network usage patterns between virtual machines. In some implementations, the leader node is further configured to select the host machine from the cluster of host machines by determining that the aggregate network bandwidth computed for the selected host machine is lower than the aggregate network bandwidths computed for the other host machines of the cluster of host machines. In some implementations, the first virtual machine configured to receive, via a communication path, a message from the second virtual machine; wherein the communication path absent spine switches.

In another aspect, the present disclosure is directed to a method of determining an optimal host machine to place a virtual machine in a virtualization environment. The virtualization environment includes a first rack of host machines and a second rack of host machines. A first host machine of the first rack of host machines is designated as a leader node and executing a first virtual machine. The method includes receiving a request to launch a second virtual machine configured to communicate with the first virtual machine. The method also includes identifying, in response to the request and from the first rack of host machines and the second rack of host machines, a cluster of host machines. The method also includes computing, for each host machine of the cluster of host machines, an aggregate network bandwidth consumed by the host machine. The method also includes selecting a host machine from the cluster of host machines based on the aggregate network bandwidth computed for the selected host machine. The method also includes launching the second virtual machine on the selected host machine.

In some implementations, the selected host machine is a second host machine of the first rack of host machines. In some implementations, the cluster of host machines is absent any host machine from the first rack of host machines. In some implementations, the method further includes computing, for each host machine of the first rack of host machines and the second rack of host machines, a resource consumption amount associated with the host machine. In some implementations, the method further includes identifying, from the first rack of host machines and the second rack of host machines, the cluster of host machines by determining that the resource consumption amounts associated with the cluster of host machines are lower than the resource consumption amounts associated with the other host machines. In some implementations, the resource is at least one of a memory space and central processing unit (CPU) cycles.

In some implementations, the method further includes computing, for each host machine of the cluster of host machines, a current network bandwidth consumed by the host machine. In some implementations, the method further includes computing, for each host machine of the cluster of host machines, an estimated network bandwidth consumed by the host machine to execute the second virtual machine. In some implementations, the method further includes computing, for each host machine of the cluster of host machines, the aggregate network bandwidth by adding the current network bandwidth to the estimated network bandwidth. In some implementations, computing the estimated network bandwidth includes computing the estimated network bandwidth based on historical network usage patterns between virtual machines.

In some implementations, the method further includes selecting the host machine from the cluster of host machines by determining that the aggregate network bandwidth computed for the selected host machine is lower than the aggregate network bandwidths computed for the other host machines of the cluster of host machines. In some implementations, the method further includes receiving, by the first virtual machine and via a communication path, a message from the second virtual machine. In some implementations, the communication path is absent spine switches.

In another aspect, the present disclosure is directed to a non-transitory computer readable storage medium to store a computer program configured to execute a method for determining an optimal host machine to place a virtual machine in a virtualization environment, the virtualization environment comprising a first rack of host machines and a second rack of host machines. In some implementations, a first host machine of the first rack of host machines is designated as a leader node and executes a first virtual machine. In some implementations, the method includes receiving a request to launch a second virtual machine configured to communicate with the first virtual machine. In some implementations, the method includes identifying, in response to the request and from the first rack of host machines and the second rack of host machines, a cluster of host machines. In some implementations, the method includes computing, for each host machine of the cluster of host machines, an aggregate network bandwidth consumed by the host machine. In some implementations, the method includes selecting a host machine from the cluster of host machines based on the aggregate network bandwidth computed for the selected host machine. In some implementations, the method includes launching the second virtual machine on the selected host machine.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

Illustrative embodiments will hereafter be described with reference to the accompanying drawings.

Figure 1A:
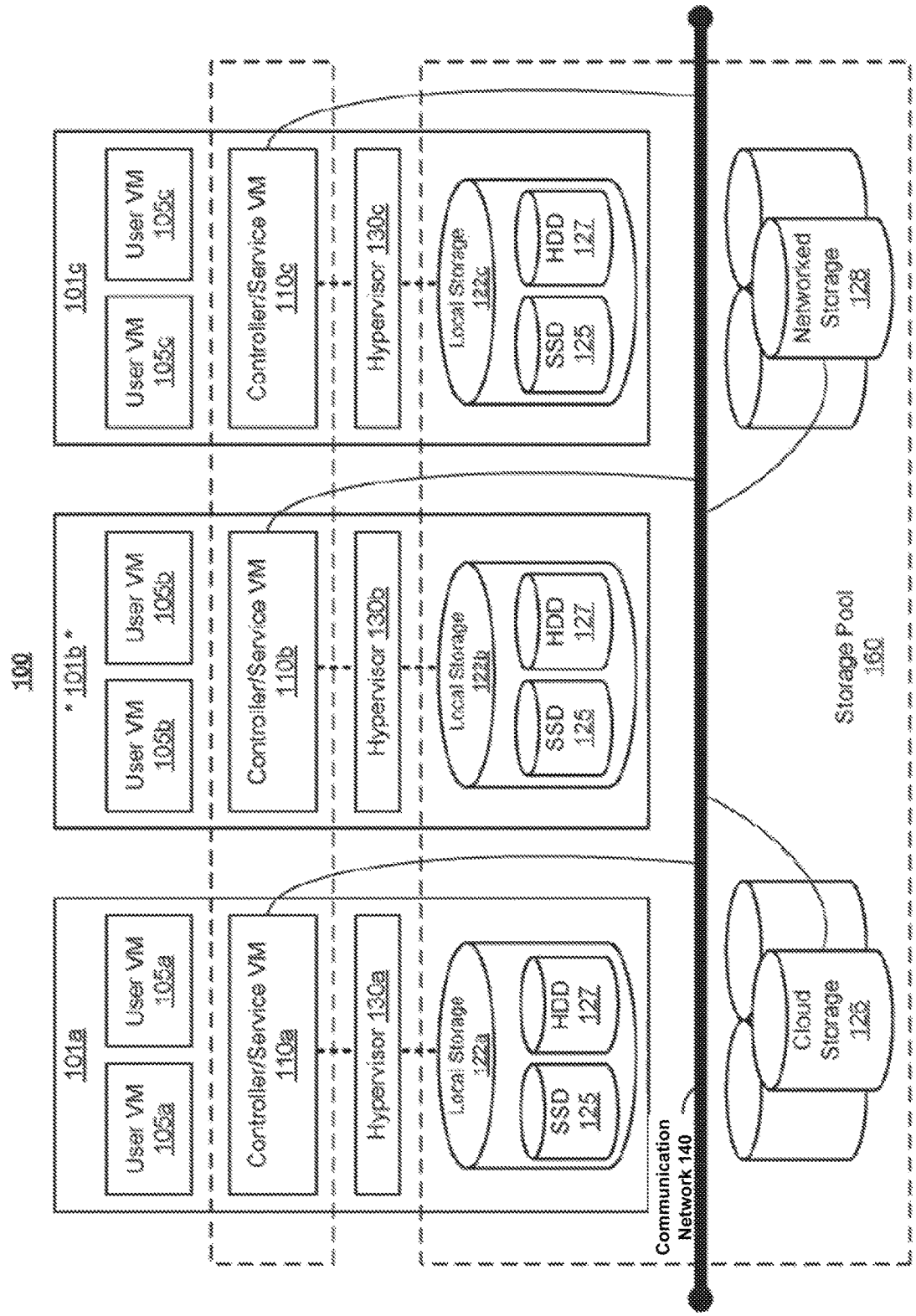
FIG. 1A is a block diagram illustrating a clustered virtualization environment, according to an illustrative implementation.

The foregoing and other features of the present disclosure will become apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

Virtual machines allow multiple independent instances to coexist simultaneously on the same physical server. This allows vastly increased utilization of the physical server's resources, requiring fewer physical systems at a data center to operate the same number of business workloads, resulting in lower system maintenance costs, less power consumption and reduced cooling demands for the enterprise. When a virtualization system receives a request from a remote computing device to launch a virtual machine on one of its host machines, the traditional approach is for the virtualization system to look at the historical CPU and memory usage of the requested virtual machine and try to match it with a host machine with sufficient available resources. However, many virtualization systems span across multiple racks of servers that are interconnected by a web of networking switches. Therefore, by selecting a host machine based only on its available CPU and memory resources, the virtualization system may inadvertently place virtual machines with active communication between one another on host machines that are separated by many layers of network switches. As such, the communication between the distant virtual machines tends to consume a majority of the overall networking bandwidth for the virtualization system, leading to networking bottlenecks and degrading virtualization experience for the end-user.

Accordingly, the systems and methods discussed herein allows a host machine designated as the leader node of a cluster of host machines, to determine an optimal host machine of the cluster to place a virtual machine based on its network communication patterns with other virtual machines. An optimally-placed virtual machine minimizes the number of network switches (e.g., leaf switches, spine switches) in a virtualization environment that the virtual machine must communicate across when communicating with other virtual machines; thereby, dramatically reducing network latency, network congestion, and the consumption of vital networking bandwidth.

In general, the virtualization environment includes a first rack of host machines and a second rack of host machines, leaf switches to interconnect the host machines of each rack, and a spine switch to interconnect the racks of host machines together. The leader node (e.g., a host machine of the first rack of host machines) receives a request from a remote computing device to launch a second virtual machine that is configured to communicate with the first virtual machine executing on the leader node. In some implementations, the first virtual machine may execute on any other host machine within the rack of host machines. In response to the request, the leader node identifies a cluster of host machines from the first rack of host machines and the second rack of host machines based on the host machines having the least CPU and/or memory usage. The leader node computes, for each host machine of the cluster of host machines, an aggregate network bandwidth consumed by the host machine assuming the host machine was selected to execute the second virtual machine. The leader node then selects a host machine from the cluster of host machines that has the least aggregate network bandwidth usage of all host machines in the cluster, and launches the second virtual machine on the selected host machine. In some implementations, the leader node may determine an optimal host machine of the cluster to re-launch an already running virtual machine based on the leader node's periodic load re-balancing procedure (i.e., a request from a computing device is not necessary to initiate the procedure).

Virtualization Technology and Environment

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the individual physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1A is a block diagram illustrating a clustered virtualization environment 100 according to an illustrative implementation. The architecture of FIG. 1A can be implemented for a distributed platform that contains multiple host machines 101a-c (also collectively referred to herein as "host machines 101") that manage multiple tiers of storage. The multiple tiers of storage may include storage that is accessible through communication network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122a-c that is incorporated into or directly attached to the respective host machine 101 and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs).

Each host machine 101 may run virtualization software, such as VMWARE ESX(I), MICROSOFT HYPER-V, or REDHAT KVM. The virtualization software includes hypervisor 130a-c to create, manage, and destroy user VMs 105, as well as managing the interactions between the underlying hardware and user VMs 105. User VMs 105 may run one or more applications that may operate as "clients" with respect to other elements within virtualization environment 100. Though not depicted in FIG. 1A, a hypervisor may connect to communication network 140. In particular embodiments, a host machine 101 may be a physical hardware computing device; in particular embodiments, a host machine 101 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 101, and work together to form a distributed system 110 that manages all the storage resources, including local storage 122, NAS 128, and cloud storage 126. The CVMs may connect to communication network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101b, as indicated by the asterisks, may be a leader node. A leader node may have a software component designated to perform operations of the leader. For example, CVM 110b on host machine 101b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 105a-c. These disks are virtual, since they are implemented by the software running inside CVMs 110a-c. Thus, to user VMs 105a-c, CVMs 110a-c appear to be exporting a clustered storage appliance that contains some disks. All user data (including the operating system) in the user VMs 105a-c and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a communication network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
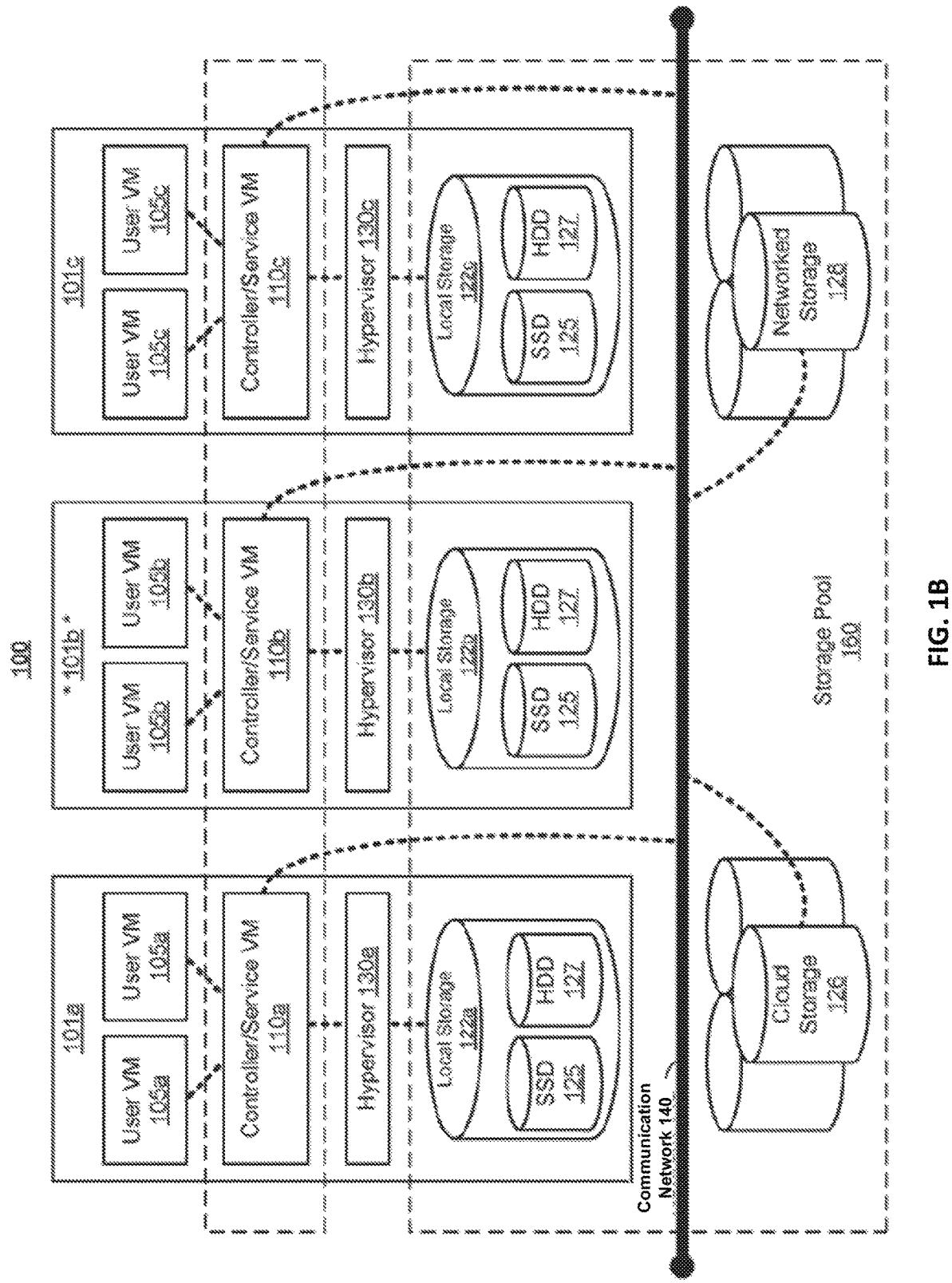
FIG. 1B is a block diagram illustrating the data flow within an example clustered virtualization environment, according to an illustrative implementation.

FIG. 1B illustrates data flow within an example clustered virtualization environment 100 according to an illustrative implementation. As described above, one or more user VMs and a CVM may run on each host machine 101 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command).

An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 101a, by connecting via communication network 140 to cloud storage 126 or NAS 128, or by connecting via communication network 140 to local storage 122b-c within another host machine 101b-c (e.g., via connecting to another CVM 110b or 110c). In some implementations, any suitable computing device (e.g., computing system 300) may be used to implement a host machine 101.

Virtual Machine Placement Based on Network Usage

Figure 2A:
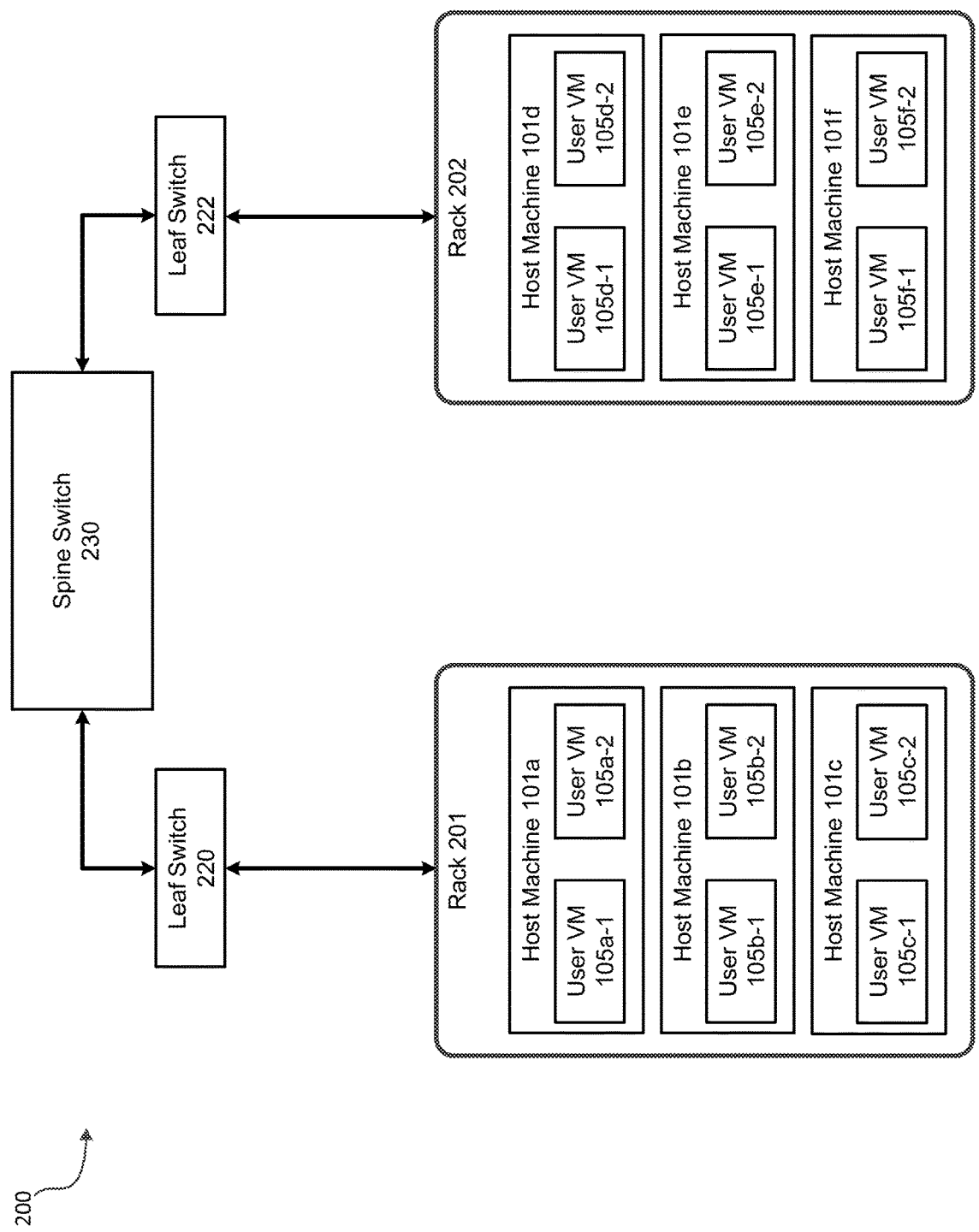
FIG. 2A is a block diagram depicting an example virtualization environment for determining an optimal host machine to place a virtual machine based on its network communication patterns with other virtual machines, according to an illustrative implementation.

FIG. 2A is a block diagram depicting an example virtualization environment for determining an optimal host machine to place a virtual machine based on its network communication patterns with other virtual machines, according to an illustrative implementation. The environment 200 includes an arrangement of computing equipment interconnected by a communication network 140 to form a data center. That is, the environment 200 includes a collection of racks 201 and 202 (collectively referred to herein as "racks 201, 202"). Rack 201 includes a collection of host machines 101a, 101b, and 101c (collectively referred to herein as "host machines 101 a-c"), such as host machines 101 a-c in FIG. 1A. Each host machine 101 a-c executes one or more virtual machines. For example, host machine 101a executes User VM 105a-1 and User VM 105a-2, host machine 101b executes User VM 105b-1 and User VM 105b-2, and host machine 101c executes User VM 105c-1 and User VM 105c-2. Similarly, rack 202 includes a collection of host machines 101d, 101e, and 101f (collectively referred to herein as "host machines 101d-f"), which may be similar in structure and functionality as any of the host machines 101 a-c in FIG. 1A. Each host machine 101d-f executes one or more virtual machines. For example, host machine 101d executes User VM 105d-1 and User VM 105d-2, host machine 101e executes User VM 105e-1 and User VM 105e-2, and host machine 101f executes User VM 105f-1 and User VM 105f-2.

The environment 200 includes a leaf switch (e.g., leaf switch 220) with a "host-side" interface and a "spine-side" interface, with each interface including a plurality of ports. The "host-side" interface connects to each host machine 101a-c of rack 201. The environment 200 also includes a second leaf switch (e.g., leaf switch 222) that connects to each host machine 101d-f of rack 202. In some implementations, the leaf switches 220, 222 may each be top-of-the-rack (TOR) switches that sit on top of racks 201, 202; respectively. The environment 200 includes a spine switch (e.g., spine switch 230) with a high-port density that connects to the "spine-side" interface of a leaf switch 220 and the "spine-side" interface of leaf switch 222. In some implementations, the host-side interface of the leaf switch 220 may also be directly connected to one or more host machines 101d-f of rack 202. In some implementations, the host-side interface of the leaf switch 222 may be directly connected to one or more host machines 101a-c of rack 201. In both implementations, the need for the spine switch 230 may be eliminated.

The environment 200 may include many thousands of remote computing devices (e.g., mobile device, laptop, server), virtual machines, host machines, racks, leaf switches, and/or spine switches. Each host machine 101 may contain a predetermined number of virtual nodes that function as the data storage layer within each host machine 101. The environment 200 provides users of remote computing devices with cloud storage and/or virtual machine resources. Although not illustrated, in many implementations, the communication network 140 may comprise one or more intermediary devices, including gateways, routers, firewalls, switches, network accelerators, Wi-Fi access points or hotspots, or other devices.

Figure 2B:
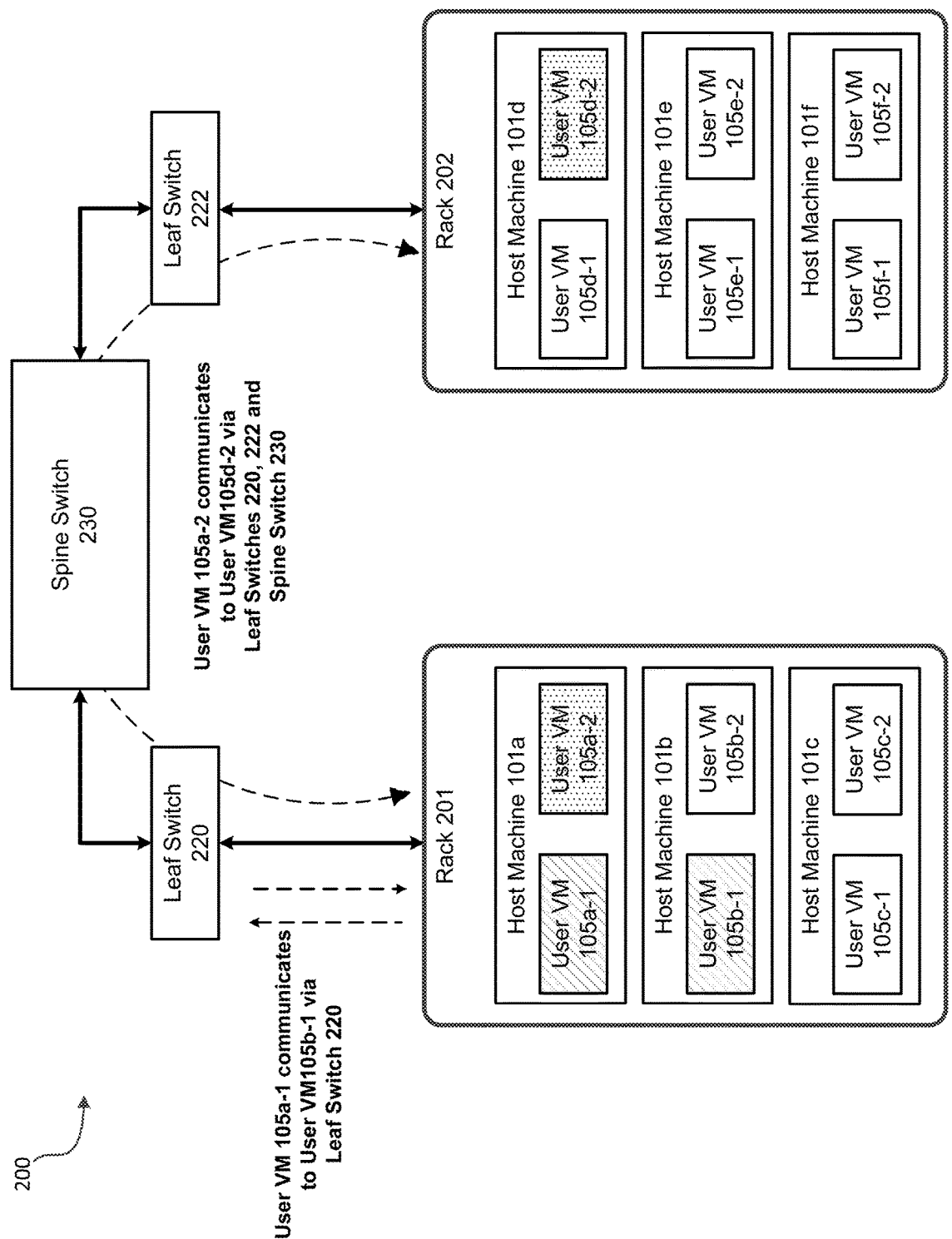
FIG. 2B is a block diagram depicting data flow within the example virtualization environment 200, according to an illustrative implementation.

FIG. 2B is a block diagram depicting data flow within the example virtualization environment 200, according to an illustrative implementation. Leaf switches 220 are configured to receive traffic from any of the virtual machines executing on any of the host machines 101a-c of rack 201 and pass the traffic to either another host machine 101a-c of rack 201 or to the spine switch 230. Likewise, leaf switches 222 are configured to receive traffic from any of the virtual machines executing on any of the host machines 101d-f of rack 202 and pass the traffic to either another host machine 101d-f of rack 202 or to the spine switch 230. Leaf switches 220, 222 are also configured to receive traffic from spine switch 230 and redirect that traffic to the appropriate host machine 101. Spine switch 230 is configured to pass bi-directional traffic between leaf switches 220, 222.

Virtual machines engaging in high throughput communication with each other consume a greater amount of the networking bandwidth of the virtualization environment 200 when the communication traverses across multiple switches (e.g., leaf switch, spine switch). For example, host machine 101a of rack 201 may executes a virtual machine (e.g., User VM 105a-2), which has a message to send to a virtual machine (e.g., User VM 105d-2) executing on host machine 101d of rack 202. As such, the message from User VM 105a-2 travels across leaf switch 220, spine switch 230, and leaf switch 222. In an alternate example, host machine 101a of rack 201 may execute a virtual machine (e.g., User VM 105a-1), which has a message to send to a virtual machine (e.g., User VM 105b-1) executing on host machine 101b of the same rack 201. In this instance, however, the message from User VM 105a-1 only has to travel across leaf switch 220 to reach User VM 105b-1. Consequently, the communication between User VM 105a-1 and User VM 105b-1 consumes less networking bandwidth than the communication between User VM 105a-2 and User VM 105d-2.

The leader node may be configured to receive a request from a computing device (e.g., a mobile device, a laptop, a desktop, another host machine 101, etc.) to execute a virtual machine on behalf of the remote computing device. In some implementations, the request may be to execute a virtual machine ("second virtual machine") configured to communicate with another ("first virtual machine") virtual machine previously launched on a host machine in the virtualization environment. In response to the request, the leader node identifies a cluster of host machines from the first rack (e.g., rack 201) of host machines and the second rack (e.g., rack 202) of host machines based on the host machines having the least resource consumption amount (e.g., CPU cycle, and/or memory space). For example, the leader node may send a request to each host machine of racks 201, 202 to request their current resource consumption amount. Each host machine sends back to the leader node their total resource consumption amount. In some implementations, each host machine sends back to the leader node the resource consumption amount for each virtual machine executing on the host machine. The leader node sorts the information, identifies the host machines with the lowest resource consumption amounts, and includes the identified host machines in the "cluster". In some implementations, the leader node may compute the resource consumption amounts based on the information received from the host machines.

In some implementations, the cluster of host machines identified by the leader node only includes one or more host machines from the first rack (e.g., rack 201) of host machines, such that the cluster is absent any host machine from the second rack (e.g., rack 202) of host machines. In some implementations, the cluster of host machines identified by the leader node only includes one or more host machines from the second rack (e.g., rack 202) of host machines, such that the cluster of host machines is absent any host machine from the first rack (e.g., rack 201) of host machines. In some implementations, the cluster of host machines includes fewer host machines than a sum of the host machines of the first rack of host machines and the host machines of the second rack of host machines.

The leader node may be configured to compute for each host machine of the cluster of host machines an aggregate network bandwidth that is consumed by the host machine assuming the host machine was selected to execute the second virtual machine. For example, the leader node computes for each host machine of the cluster of host machines a current network bandwidth consumed by the host machine when it is not executing the second virtual machine. The leader node then computes for each host machine of the cluster of host machines an estimated network bandwidth consumed by the host machine assuming it executes the second virtual machine. Lastly, the leader node computes for each host machine of the cluster of host machines the aggregate network bandwidth by adding the current network bandwidth to the estimated network bandwidth. In some implementations, the leader node computes the estimated network bandwidth based on historical network usage patterns between virtual machines.

The leader node may be configured to select a host machine from the cluster of host machines. For example, the leader node may select a host machine from the cluster of host machines by determining that the aggregate network bandwidth computed for the selected host machine is lower than the aggregate network bandwidths computed for the other host machines of the cluster of host machines. For example, the leader node may select host machine 101b as the host machine to place/launch the second virtual machine based on host machine 101b consuming the least about of networking bandwidth of the virtualization environment. The leader node may be configured to then launch the second virtual machine on the selected host machine.

In some implementations, the leader node may determine an optimal host machine of the cluster to re-launch an already running virtual machine based on the leader node's periodic load re-balancing procedure. For example, the leader node may periodically (e.g., every minute, hourly, daily, weekly, monthly, or any other such time period) send a request to each host machine of racks 201, 202 requesting resource consumption amounts associated with each of the virtual machines executing on the host machines. The leader node may then identify one or more virtual machines that consume excessive resources from the virtualization environment, terminate the virtual machines, and re-launch the virtual machines on host machines permitting communicate between the virtual machines without having to traverse multiple network switches (e.g., leaf switch, spine switch).

Figure 3:
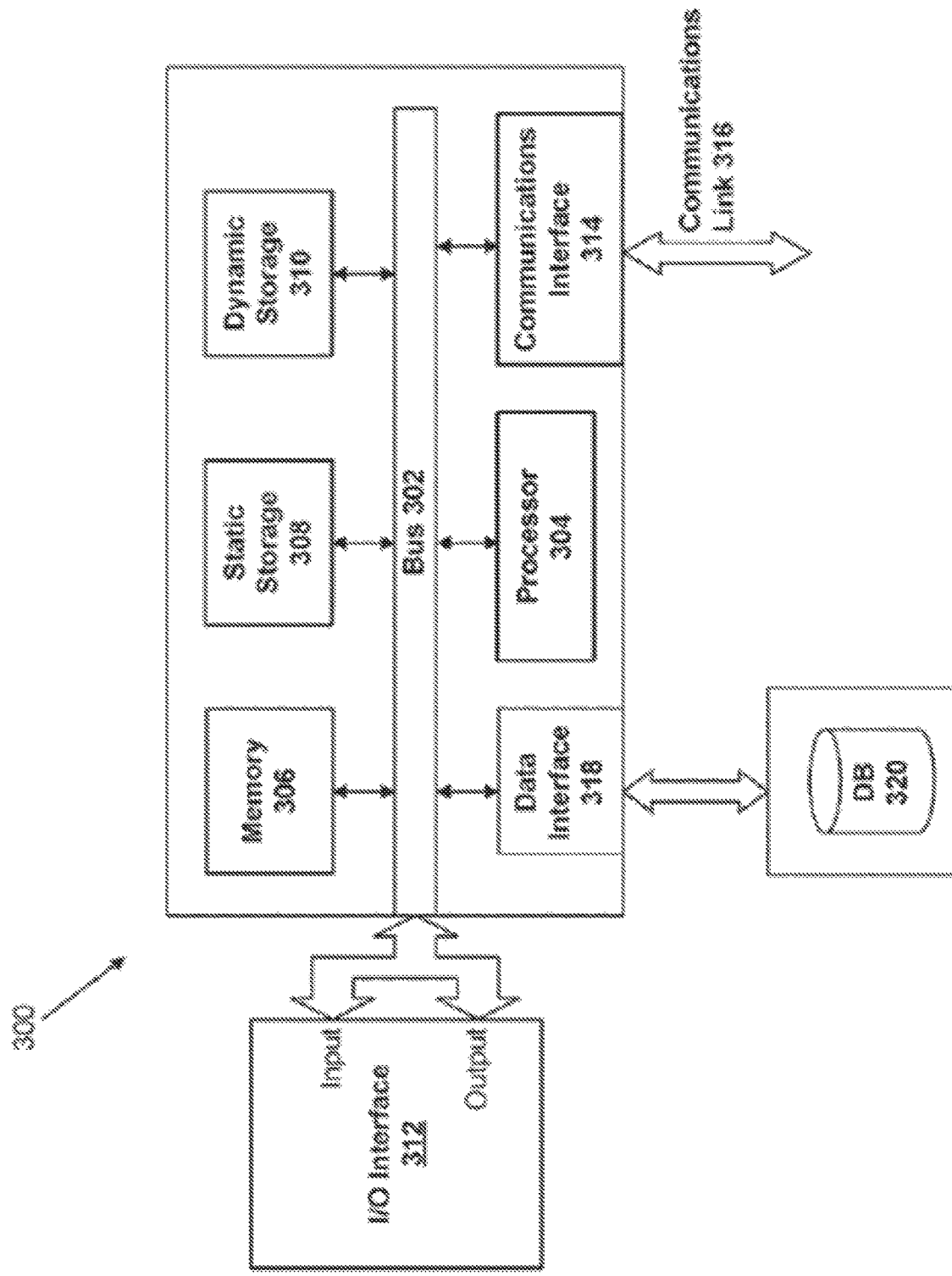
FIG. 3 is a block diagram of an illustrative computing system suitable for implementing particular embodiments.

FIG. 3 is a block diagram of an illustrative computing system 300 suitable for implementing particular embodiments. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

Computer system 300 includes a bus 302 (e.g., an address bus and a data bus) or other communication mechanism for communicating information, which interconnects subsystems and devices, such as processor 304, memory 306 (e.g., RAM), static storage 308 (e.g., ROM), dynamic storage 310 (e.g., magnetic or optical), communication interface 314 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 312 (e.g., keyboard, keypad, mouse, microphone). In particular embodiments, computer system 300 may include one or more of any such components.

In particular embodiments, processor 304 includes hardware for executing instructions, such as those making up a computer program. As an example and not by way of limitation, to execute instructions, processor 304 may retrieve (or fetch) the instructions from an internal register, an internal cache, memory 306, static storage 308, or dynamic storage 310; decode and execute them; and then write one or more results to an internal register, an internal cache, memory 306, static storage 308, or dynamic storage 310. In particular embodiments, processor 304 may include one or more internal caches for data, instructions, or addresses. This disclosure contemplates processor 304 including any suitable number of any suitable internal caches, where appropriate. As an example and not by way of limitation, processor 304 may include one or more instruction caches, one or more data caches, and one or more translation lookaside buffers (TLBs). Instructions in the instruction caches may be copies of instructions in memory 306, static storage 308, or dynamic storage 310, and the instruction caches may speed up retrieval of those instructions by processor 304. Data in the data caches may be copies of data in memory 306, static storage 308, or dynamic storage 310 for instructions executing at processor 304 to operate on; the results of previous instructions executed at processor 304 for access by subsequent instructions executing at processor 304 or for writing to memory 306, static storage 308, or dynamic storage 310; or other suitable data. The data caches may speed up read or write operations by processor 304. The TLBs may speed up virtual-address translation for processor 304. In particular embodiments, processor 304 may include one or more internal registers for data, instructions, or addresses. This disclosure contemplates processor 304 including any suitable number of any suitable internal registers, where appropriate. Where appropriate, processor 304 may include one or more arithmetic logic units (ALUs); be a multi-core processor; or include one or more processors 302. Although this disclosure describes and illustrates a particular processor, this disclosure contemplates any suitable processor.

In particular embodiments, I/O interface 312 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 312 for them. Where appropriate, I/O interface 312 may include one or more device or software drivers enabling processor 304 to drive one or more of these I/O devices. I/O interface 312 may include one or more I/O interfaces 312, where appropriate. Although this disclosure describes and illustrates a particular I/O interface, this disclosure contemplates any suitable I/O interface.

In particular embodiments, communication interface 314 includes hardware, software, or both providing one or more interfaces for communication (such as, for example, packet-based communication) between computer system 300 and one or more other computer systems 300 or one or more networks. As an example and not by way of limitation, communication interface 314 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 314 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 314 for any of these networks, where appropriate. Communication interface 314 may include one or more communication interfaces 314, where appropriate. Although this disclosure describes and illustrates a particular communication interface, this disclosure contemplates any suitable communication interface.

One or more memory buses (which may each include an address bus and a data bus) may couple processor 304 to memory 306. Bus 302 may include one or more memory buses, as described below. In particular embodiments, one or more memory management units (MMUs) reside between processor 304 and memory 306 and facilitate accesses to memory 306 requested by processor 304. In particular embodiments, memory 306 includes random access memory (RAM). This RAM may be volatile memory, where appropriate, this RAM may be dynamic RAM (DRAM) or static RAM (SRAM). Moreover, where appropriate, this RAM may be single-ported or multi-ported RAM. This disclosure contemplates any suitable RAM. Memory 306 may include one or more memories 306, where appropriate. Although this disclosure describes and illustrates particular memory, this disclosure contemplates any suitable memory.

Where appropriate, the ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 310 may include a hard disk drive (HDD), a floppy disk drive, flash memory, an optical disc, a magneto-optical disc, magnetic tape, or a Universal Serial Bus (USB) drive or a combination of two or more of these. Dynamic storage 310 may include removable or non-removable (or fixed) media, where appropriate. Dynamic storage 310 may be internal or external to computer system 300, where appropriate. This disclosure contemplates mass dynamic storage 310 taking any suitable physical form. Dynamic storage 310 may include one or more storage control units facilitating communication between processor 304 and dynamic storage 310, where appropriate.

In particular embodiments, bus 302 includes hardware, software, or both coupling components of computer system 300 to each other. As an example and not by way of limitation, bus 302 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 302 may include one or more buses 306, where appropriate. Although this disclosure describes and illustrates a particular bus, this disclosure contemplates any suitable bus or interconnect.

According particular embodiments, computer system 300 performs specific operations by processor 304 executing one or more sequences of one or more instructions contained in memory 306. Such instructions may be read into memory 306 from another computer readable/usable medium, such as static storage 308 or dynamic storage 310. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 304 for execution. Such a medium may take many forms, including but not limited to, nonvolatile media and volatile media. Non-volatile media includes, for example, optical or magnetic disks, such as static storage 308 or dynamic storage 310. Volatile media includes dynamic memory, such as memory 306.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 300; in alternative embodiments, two or more computer systems 300 coupled by communication link 316 (e.g., LAN, PTSN, or wireless network) may perform the sequence of instructions in coordination with one another.

Computer system 300 may transmit and receive messages, data, and instructions, including program, i.e., application code, through communication link 316 and communication interface 314. Received program code may be executed by processor 304 as it is received, and/or stored in static storage 308 or dynamic storage 310, or other non-volatile storage for later execution. A database 320 may be used to store data accessible by the system 300 by way of data interface 318.

Figure 4:
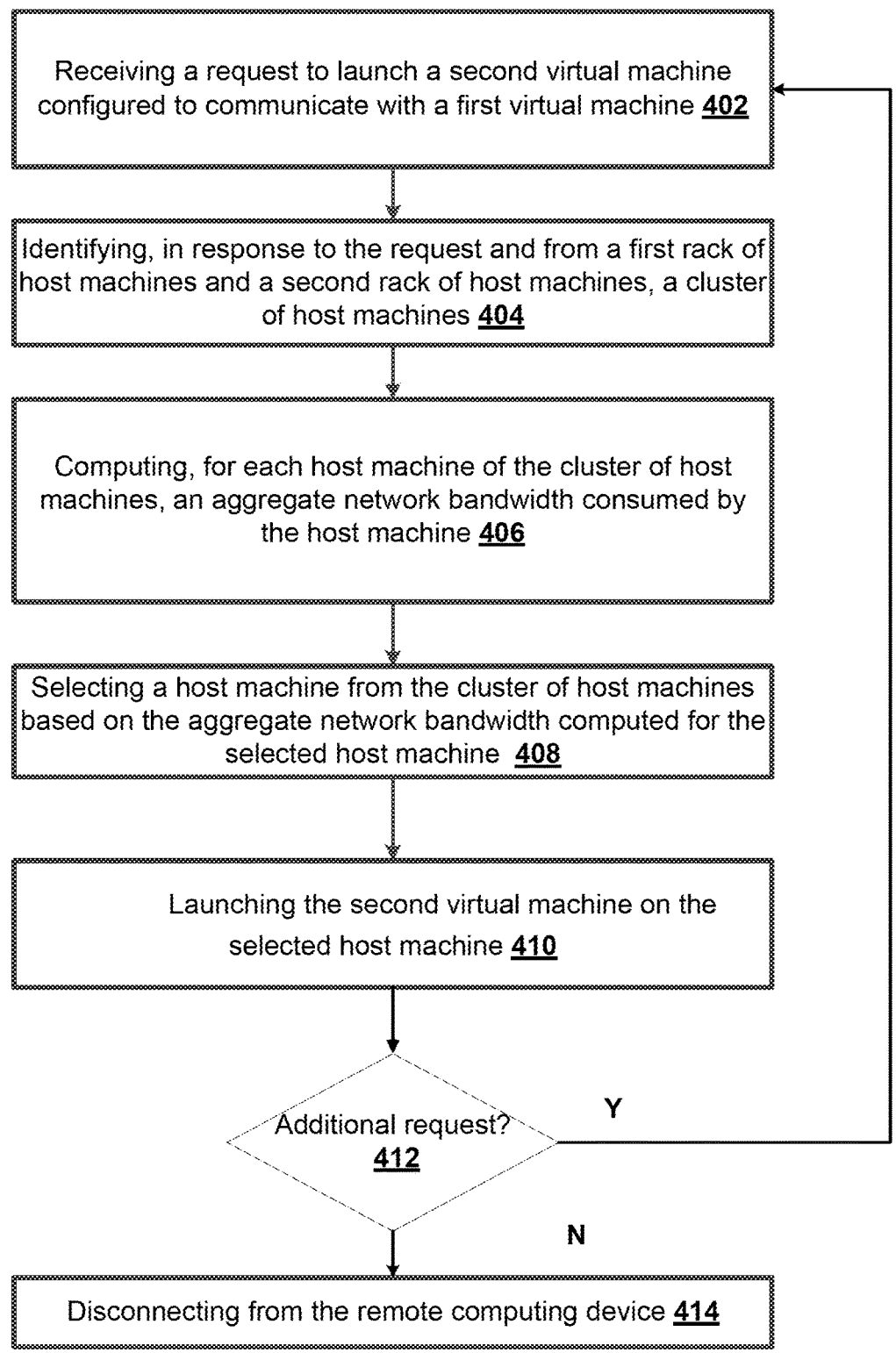
FIG. 4 is a flow diagram depicting a method for determining an optimal host machine to place a virtual machine based on its network communication patterns with other virtual machines, according to an illustrative implementation.

FIG. 4 is a flow diagram depicting a method for determining an optimal host machine to place a virtual machine in a virtualization environment, according to an illustrative implementation. The virtualization environment includes a first rack of host machines and a second rack of host machines. In some implementations, the first host machine of the first rack of host machines is designated as a leader node and executes a first virtual machine. Additional, fewer, or different operations may be performed in the method depending on the particular implementation. In some implementations, some or all operations of method 400 may be performed by a host machine, such any host machine 101 in FIG. 1A. In some operations, some or all operations of method 400 may be performed by the leader node. Each operation may be re-ordered, added, removed, or repeated.

As shown, the method 400 begins with operation 402 where a leader node performs an operation of receiving a request to launch a second virtual machine configured to communicate with the first virtual machine. At operation 404, the leader node performs the operation of identifying, in response to the request and from the first rack of host machines and the second rack of host machines, a cluster of host machines. At operation 406, the leader node performs the operation of computing, for each host machine of the cluster of host machines, an aggregate network bandwidth consumed by the host machine. In some implementations, the leader node computes the aggregate network bandwidth by adding a current network bandwidth to an estimated network bandwidth. At operation 408, the leader node performs the operation of selecting a host machine from the cluster of host machines based on the aggregate network bandwidth computed for the selected host machine. At operation 410, the leader node performs the operation of launching the second virtual machine on the selected host machine. At operation 412, the leader node determines whether a user device sends an additional request to launch a virtual machine. If yes, then the leader node proceeds to operation 402 to repeat the process 400 for the additional request. Otherwise, the leader node proceeds to operation 414 to perform the operation of disconnecting from the remote computing device (e.g., user device).

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

It should be understood that no claim element herein is to be construed under the provisions of 35 U.S.C. § 112(f), unless the element is expressly recited using the phrase "means for."

What is claimed is:

1. An apparatus comprising a processor having programmed instructions stored in a memory that when executed by the processor, cause the processor to:
   receive a request to launch a first virtual machine (VM) on a first host machine of a plurality of host machines, wherein the first VM is configured to communicate with a second VM of a second host machine;
   compute a first estimated network bandwidth consumed by the first host machine to execute the first VM based on historical network usage communication patterns between virtual machines;
   compute a second estimated network bandwidth consumed by another host machine in the plurality of host machines based on historical network usage communication patterns between virtual machines; and
   upon determining that the first estimated network bandwidth is lower than the second estimated network bandwidth consumed by another host machine, launch the first VM on the first host machine.

2. The apparatus of claim 1, the processor having programmed instructions to:
   compute, for each host machine of a cluster of host machines, a current network bandwidth consumed by the host machine; and
   compute, for each host machine of the cluster of host machines, an aggregate network bandwidth of the plurality of aggregate network bandwidths, wherein the aggregate network bandwidth is computed by adding the current network bandwidth to the estimated network bandwidth.

3. A method comprising:
   receiving a request to launch a first virtual machine (VM) on a first host machine of a plurality of host machines;
   computing an estimated network bandwidth consumed by the first host machine to execute the first VM based on historical network usage communication patterns between virtual machines;
   computing a second estimated network bandwidth consumed by another host machine in the plurality of host machines based on historical network usage patterns communication patterns between virtual machines; and
   upon determining that the first estimated network bandwidth is lower than the second network bandwidth consumed by another host machine, launch the first VM on the first host machine.

4. The method of claim 3, wherein the first virtual machine is configured to communicate with a second virtual machine of a second host machine, and wherein the first host machine and the second host machine are on a same rack of host machines.

5. The method of claim 3, further comprising:
   computing, for each host machine of a cluster of host machines, a current network bandwidth consumed by the host machine; and
   computing, for each host machine of the cluster of host machines, an aggregate network bandwidth of the plurality of aggregate network bandwidths, wherein the aggregate network bandwidth is computed by adding the current network bandwidth to the estimated network bandwidth.

6. A non-transitory computer readable storage medium to store a computer program configured to execute a method comprising:
   receiving a request to launch a first virtual machine (VM) on a first host machine of a plurality of host machines;

computing an estimated network bandwidth consumed by the first host machine to execute the first VM based on historical network usage communication patterns between virtual machines;

computing a second estimated network bandwidth consumed by another host machine in the plurality of host machines based on historical network usage patterns communication patterns between virtual machines; and upon determining that the first estimated network bandwidth is lower than the second estimated network bandwidth consumed by another host machine, launch the first VM on the first host machine.

7. The apparatus of claim 1, the processor having programmed instructions to identify, in response to the request, host machines from a first rack of host machines and a second rack of host machines.

8. The apparatus of claim 1, the processor having programmed instructions to compute, for each host machine of a cluster of host machines, an aggregate network bandwidth of the plurality of aggregate network bandwidths, wherein the aggregate network bandwidth is consumed by the host machine.

9. The apparatus of claim 1, wherein the first virtual machine of the first host machine is configured to communicate with a second virtual machine of a second host machine via a plurality of switches in series, and wherein the first aggregate network bandwidth is proportional to the plurality of switches in series.

10. The method of claim 3, further comprising computing, for each host machine of a cluster of host machines, an aggregate network bandwidth of the plurality of aggregate network bandwidths, wherein the aggregate network bandwidth is consumed by the host machine.

11. The method of claim 3, wherein the first virtual machine of the first host machine is configured to communicate with a second virtual machine of a second host machine via a plurality of switches in series, and wherein the first aggregate network bandwidth is proportional to the plurality of switches in series.

12. The non-transitory computer readable storage medium of claim 6, the method further comprising computing, for each host machine of a cluster of host machines, an aggregate network bandwidth of the plurality of aggregate network bandwidths, wherein the aggregate network bandwidth is consumed by the host machine.

13. The non-transitory computer readable storage medium of claim 6, wherein the first virtual machine is configured to communicate with a second virtual machine of a second host machine, and wherein the first host machine and the second host machine are on a same rack of host machines.

14. The non-transitory computer readable storage medium of claim 6, the method further comprising:

computing, for each host machine of the first rack of host machines and the second rack of host machines, a resource consumption amount associated with the host machine; and identifying, from the first rack of host machines and the second rack of host machines, a cluster of host machines by determining that the resource consumption amounts associated with the cluster of host machines are lower than the resource consumption amounts associated with the other host machines.

15. The non-transitory computer readable storage medium of claim 6, the method further comprising:

computing, for each host machine of a cluster of host machines, a current network bandwidth consumed by the host machine; and computing, for each host machine of the cluster of host machines, an aggregate network bandwidth of the plurality of aggregate network bandwidths, wherein the aggregate network bandwidth is computed by adding the current network bandwidth to the estimated network bandwidth.

16. The non-transitory computer readable storage medium of claim 6, wherein the first virtual machine of the first host machine is configured to communicate with a second virtual machine of a second host machine via a plurality of switches in series, and wherein the first aggregate network bandwidth is proportional to the plurality of switches in series.

17. The apparatus of claim 1, the processor having programmed instructions to:

compute, for each host machine of the first rack of host machines and the second rack of host machines, a resource consumption amount associated with the host machine; and identify, from the first rack of host machines and the second rack of host machines, a cluster of host machines by determining that the resource consumption amounts associated with the cluster of host machines are lower than the resource consumption amounts associated with the other host machines.

18. The method of claim 3, further comprising:

computing, for each host machine of the first rack of host machines and the second rack of host machines, a resource consumption amount associated with the host machine; and identifying, from the first rack of host machines and the rack of host machines, a cluster of host machines by determining that the resource consumption amounts associated with the cluster of host machines are lower than the resource consumption amounts associated with the other host machines.

* * * * *